United States Patent [19]

Townsend et al.

[11] 4,424,421
[45] Jan. 3, 1984

[54] APPARATUS FOR TESTING SUBSCRIBER CARRIER SYSTEMS

[75] Inventors: Todd V. Townsend, Reno; Thomas Streenan, Carson City, both of Nev.

[73] Assignee: Lynch Communication Systems, Inc., Reno, Nev.

[21] Appl. No.: 314,212

[22] Filed: Oct. 23, 1981

[51] Int. Cl.³ ........................ H04M 3/30; H04M 3/32
[52] U.S. Cl. ........................ 179/175.3 R; 179/175.2 R
[58] Field of Search .............. 179/175.3 R, 175.3 F, 179/175.2 R, 175.2 D, 175.2 C; 370/14; 324/51, 52

[56] References Cited

U.S. PATENT DOCUMENTS

| | | | |
|---|---|---|---|
| 3,410,966 | 11/1968 | Davies | 179/175.2 |
| 3,431,369 | 3/1969 | McLaughlin | 179/175.3 |
| 3,436,496 | 4/1969 | Ingle | 179/175.3 |
| 3,571,530 | 3/1971 | Davies | 179/175.2 |
| 3,674,947 | 7/1972 | Chulak | 179/175.3 |
| 3,705,275 | 12/1972 | Layburn et al. | 179/175.3 |
| 3,906,174 | 9/1975 | Dotter | 179/175.3 |
| 3,980,839 | 9/1976 | Hutcheson | 179/175.2 R |
| 4,112,264 | 9/1978 | Abramson | 179/175.3 |
| 4,208,552 | 6/1980 | Castriotta et al. | 179/175.2 D |

Primary Examiner—Stafford D. Schreyer
Attorney, Agent, or Firm—Weissenberger and Peterson

[57] ABSTRACT

A telephone subscriber testing system is disclosed in which all tests may be performed from a central office. A central office test device is connected to the central office by a separate telephone line with a telephone number of its own. Moreover, a dedicated command channel connects the office test device with a remote test device over the carrier lines. This dedicated channel is used to communicate commands and transmit test results back to the central office. By causing the remote device to "dial up" the office device, the entire trunk loop through the PCM trunk and the central office switching equipment can be tested directly in one measurement at the central office.

19 Claims, 18 Drawing Figures

APPARATUS FOR TESTING SUBSCRIBER CARRIER SYSTEMS

BACKGROUND OF THE INVENTION

With the skyrocketing costs of installing new cable, subscriber carrier systems are becoming more popular. A subscriber carrier system can typically allow 24 channels to be multiplexed over a single T1 line. A major shortcoming of these systems has been testability of the carrier and subscriber drops. Due to the isolation of the subscriber from the central office (C.O.) by the multiplexing equipment, standard test desk procedures are nearly useless. A trouble report indicating no ringing at the subscriber end could result in sending a maintenance person 50 miles out to check a subscriber's telephone only to find that the problem was actually back at the C.O. end. The cost of sending personnel and repair trucks out to a site is escalating at a tremendous rate. A suitable testing system, though not revenue-generating, will quickly pay for itself by exactly pinpointing the location of the fault.

When testing a long distance circuit in which individual subscriber lines are concentrated through a single PCM trunk, it is conventional to use two separate test devices, each of which is connected to the individual subscriber lines through a bank of relays. One of these test devices is located at the central office end, the other at the subscriber end, and the central office test device is connected to the subscriber end test device through a dedicated command channel which allows remote controlled operation of the subscriber end test device.

SUMMARY OF THE INVENTION

The present invention consists of replacing the test device at the central office end with a test device which is connected to the C.O. not by way of any of the subscriber lines, but rather by way of a separate telephone line with a telephone number of its own (see FIG. A). By causing the Remote Test Set (RTS) to dial the number of the Office Test Set (OTS), the entire trunk loop can be tested directly in one measurement at the central office.

The subscriber loop and the outgoing path through the PCM trunk can be tested by the RTS and the results can be reported to the central office via the dedicated channel.

In addition to greatly reduced costs for maintenance, another advantage of the system is the elimination of the need for cutting into usually hard-wired (as opposed to connectorized) C.O. equipment. This saves rack space and relays at the central office end.

The system can be accessed at the OTS by one of three methods:
  (1) Front Panel
  (2) Teletype
  (3) Modem All messages and results are displayed exactly the same way on all three devices. Modem control allows centralized testing of an unlimited number of remote systems. Up to 383 channels of subscriber carrier can be connected to an RTS in the preferred embodiment. All wiring to the RTS can be made by plug-in connectors.

The present invention in its preferred embodiment can perform the following tests:

DROP TESTS
  1. Resistance (0–900 k$\Omega$)
     Tip to Ground
     Ring to Ground
     Tip to Ring
  2. Capacitance (0–5.12 $\mu f$)
     Tip to Ground
     Ring to Ground
     Tip to Ring
  3. D.C. Foreign Battery (0–165 V)
     Tip to Ground
     Ring to Ground
  4. A.C. Foreign Battery (0–120 V)
     Tip to Ground
     Ring to Ground CARRIER TESTS
  1. db Level-Office to Remote
  2. db Level-Remote to Office
  3. Dial Tone-Office and Remote
  4. Ringing-Office and Remote
  5. Noise-Office and Remote Each individual test is described in detail below. In addition, the test system also has the capacity to perform a number of automatic tests: All tests on a single channel with results displayed; all tests on a single channel on a go-no go basis; all tests on all channels on a go-no go basis.

Each end of the test system (OTS and RTS) contains a microprocessor control board. The OTS contains a 4,000 byte stored program making functional changes easy to implement by simply changing the stored program. The RTS contains a 1,000 byte program and it, like the OTS, can easily have changes or additions implemented. Power to the relays is removed in the event a failure is detected during the self test mode, thereby reducing the chances of relays energizing inadvertently.

The RTS can be expanded in 24 channel increments up to 383 channels (1 channel is used for data communications). The RTS has seven switches used to store the office maintenance telephone number. During carrier testing, the RTS energizes the desired relay, seizes a carrier channel, checks for dial tone and then dials the 7-digit stored number. The OTS waits for ringing voltage on the maintenance line and seizes the line after ringing is detected, whereupon level tests can be performed.

It should be noted that prior art systems do not have remote dialing capability. Therefore, they do not have the ability to carry out level testing in both directions. As noted above, the present invention provides for db level tests to be conducted in either direction. Moreover, the lines may be checked for noise in excess of 23 dbrnc.

Subscriber ringing is tested by entering the subscriber's 7-digit telephone number into the OTS. The OTS dials the subscriber's number using the maintenance line. The RTS will energize the selected relay, monitor the carrier for ringing for approximately 5 seconds and then transmit the results back to the OTS.

Another major advantage of the present invention is that drop tests can be performed from the OTS without involving the carrier, i.e., any response by the RTS to a requested test will assure that the carrier is not falsifying the results.

BRIEF DESCRIPTION OF THE DRAWINGS

FIG. A is a block diagram showing the major operating components of the ALERT System of this invention.

FIG. B is a diagram showing a portion of FIG. A in more detail, and illustrating the subscriber line connections to the Remote Test Set (RTS).

DESCRIPTION OF THE PREFERRED EMBODIMENT

An overview of the hardware of the present invention is presented in FIG. A. A conventional central office switch 22 houses subscriber lines 24. A separate telephone line 23 with a telephone number of its own is connected to an Office Test Set (OTS) 37. Moreover, subscriber lines 24 are multiplexed by carrier devices 32 for transmission to the remote location over carrier channels 25. As discussed above, a subscriber carrier system can typically allow 24 channels to be multiplexed over a single T1 line.

At the remote location, channels 25 are demultiplexed and distributed to the subscriber lines 34. In addition, each demultiplexed carrier channel 26 is connected to a Remote Test Set (RTS) 36 by drop lines 27.

The OTS 37 and the RTS 36 are connected through the carrier system by a dedicated command channel 30 provided to transmit commands from the OTS to the RTS and to transmit test results from the RTS.

FIG. B is an isolated enlarged diagram of FIG. A, illustrating a typical connection between a subscriber line 26 and the RTS 36 via drop line relays 27. When the RTS addresses the system, normally closed (N.C.) lines 26 open and normally open lines 27 close to divert the subscriber line through the test set. Moreover, the present invention provides for hold relays 28 in the RTS which work in conjunction with sensing devices 29. One hold relay 28 is provided for each drop line 27, and functions to prevent dropping the subscriber when a test is to be performed.

When a particular test is requested by the OTS, sensing device 29 first detects whether subscriber line 26 is currently being used. If line 26 is presently occupied, the RTS will transmit a busy code to the OTS. If, however, the line is not busy, then testing can commence.

Figure 1:
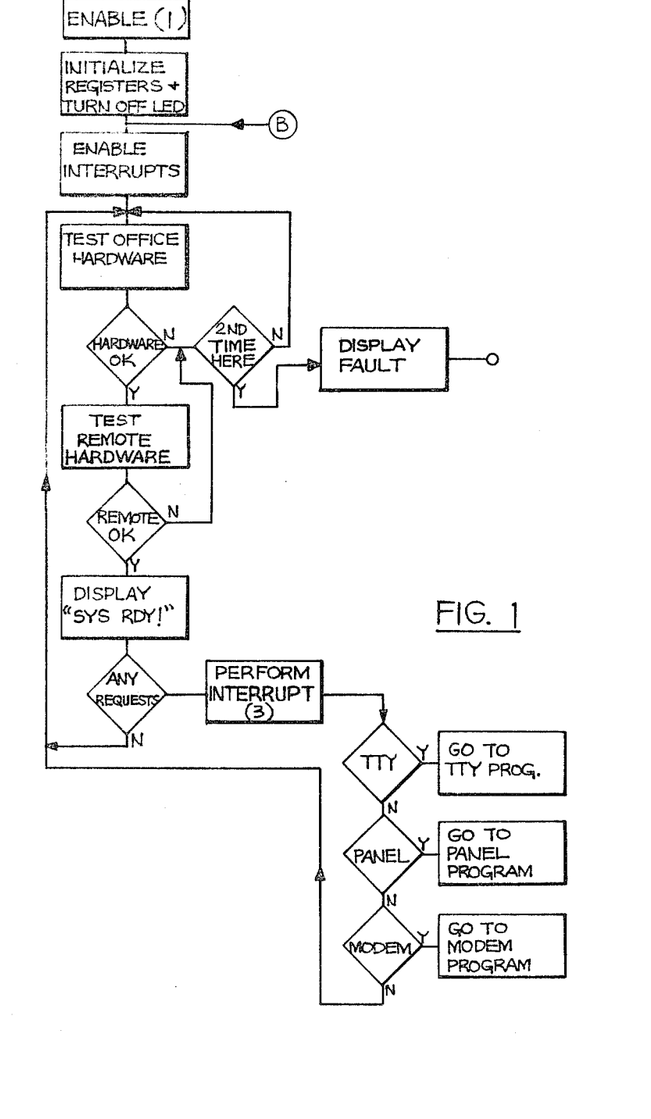
FIG. 1 is a flow chart of the overall system accommodating the three input/output (I/O) devices discussed above.
Figures 2, 11:
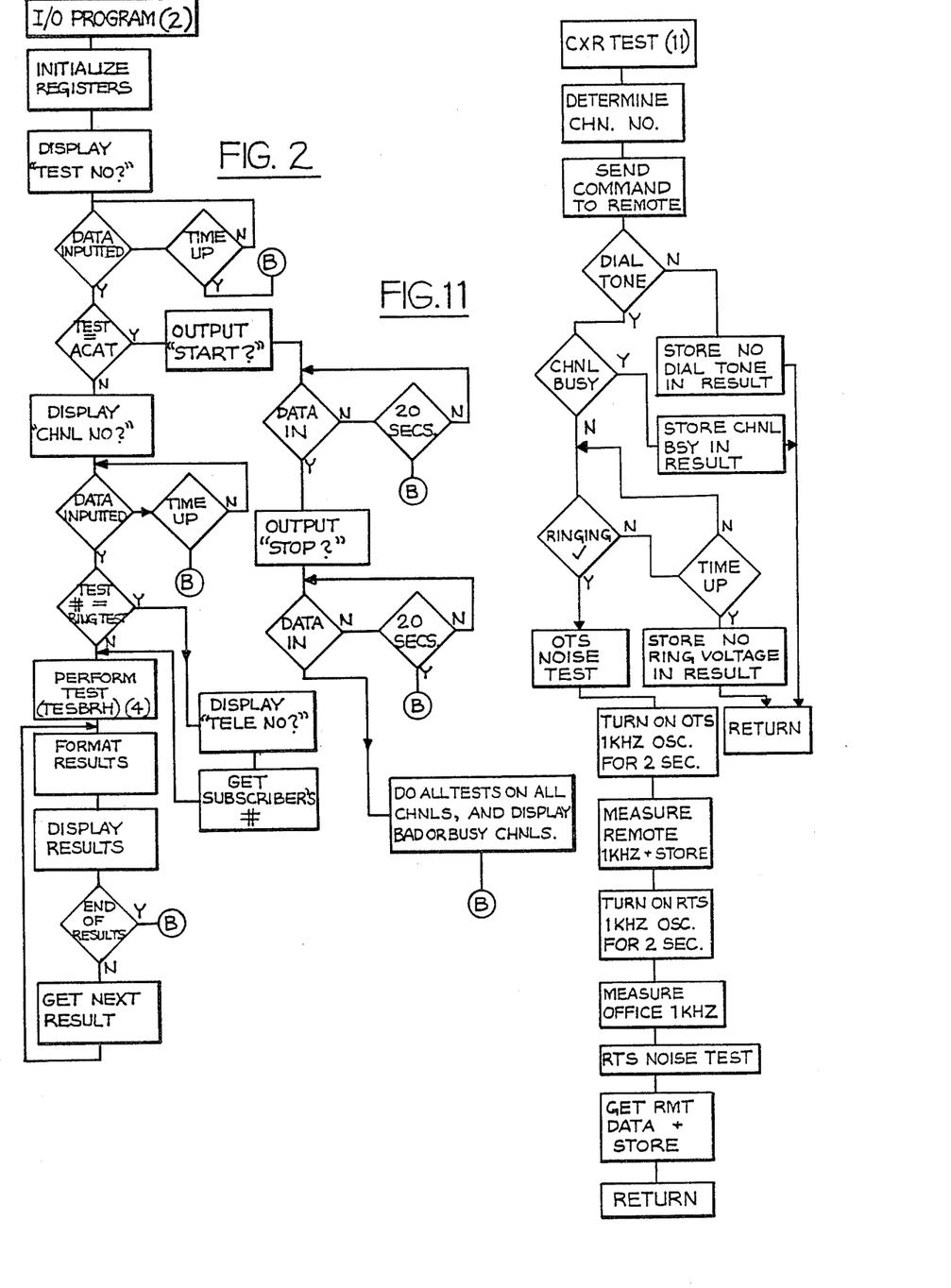
FIG. 2 is a typical I/O program.
FIG. 11 is another carrier test routine designed to measure the db level of a 1 KHZ tone received over the carrier.

FIGS. 1 and 2 are the operating system routines (Master Test System) of the hardware of FIG. A and FIG. B. The Master Test System coordinates the programs of the OTS and the RTS and all hardware equipment. Unless interrupted, the system continuously conducts self-testing procedures.

ENABLE 1

Figures 3, 10, 12, 13, 14:
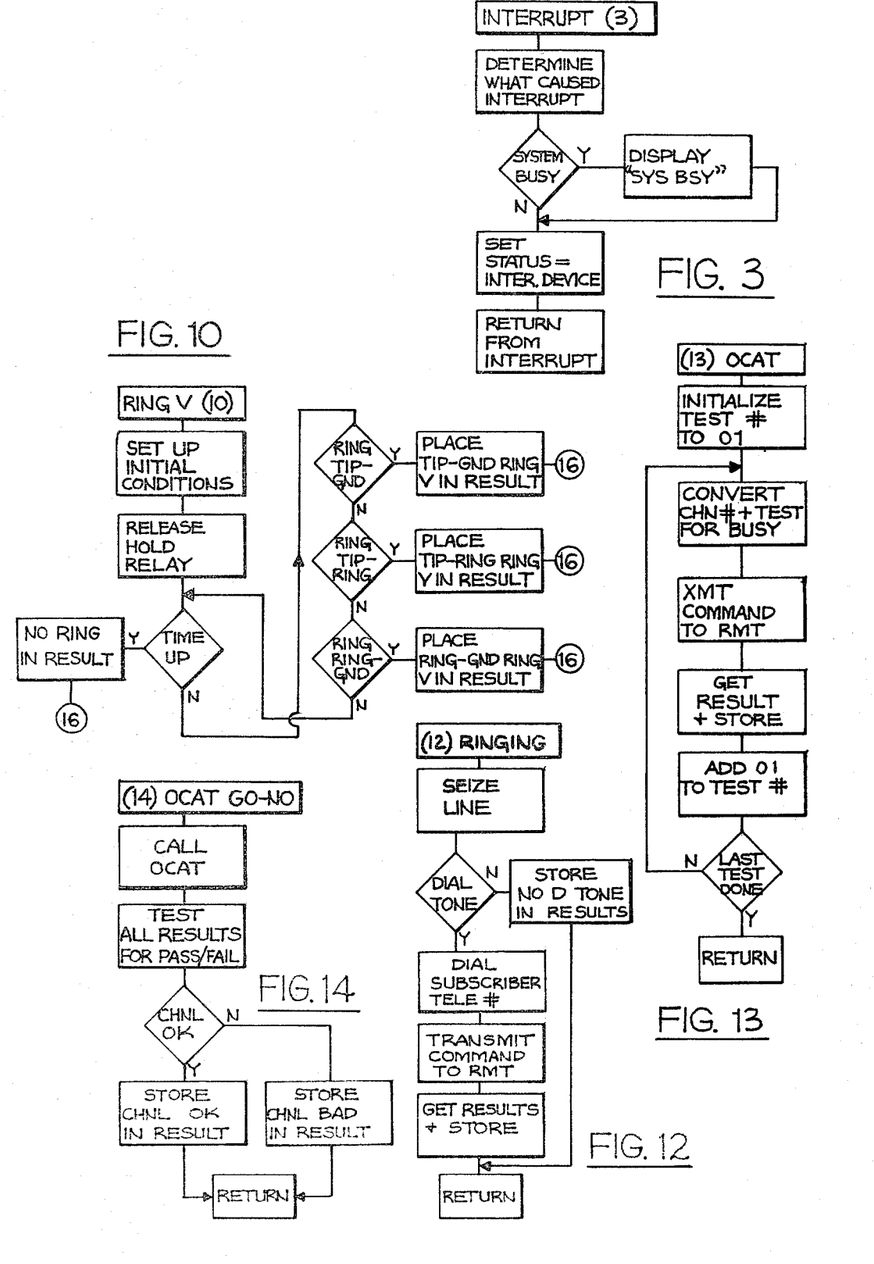
FIG. 3 is an interrupt input subroutine.
FIG. 10 is a ring voltage test routine designed to check the location and amplitude of the ring voltage on the subscriber line leads.
FIG. 12 is a dial-up test routine.
FIG.13 is a routine designed to perform all tests on a single channel-one channel, all tests (OCAT).
FIG. 14 is a subroutine designed to perform all tests on a single channel in the go-no go mode.

FIG. 1 is a routine designed to test the central office (C.O.) hardware, the remote hardware and enable the I/O devices. The system first initializes the microprocessors' registers and turns off the light-emitting diode (LED) on the front display panel. Thereafter, it enables interrupts. If the system is interrupted at this point, it will branch to subroutine INTERRUPT 3. Upon return from this subroutine or if no interrupt took place, the system will continuously conduct self-testing procedures. There are conventional routines designed to test various components of the hardware system.

If the office hardware is not functioning propely, the system will test it a second time. If the office hardware malfunctions a second time, the system will display FAULT and the program halts. If, however, the hardware is then in working order, the system will conduct a test of the remote hardware. If the remote hardware is not functioning properly, the system will conduct the remote test a second time. Upon a second malfunction of the remote hardware, the system will display FAULT and the program halts.

If, on the other hand, the remote hardware is functioning well, the system will display SYS RDY?, confirming that the system is ready. The system then inquires whether any requests from the I/O devices were made. If none were made, the system branches back to the office hardware testing procedure and repeats the above sequence.

If a request was made, however, then the operating system will inquire as to which I/O device was used for the request and go to the corresponding I/O program (FIG. 2). If the operating system finds no requesting I/O devices, it will also default back to the office hardware testing sequence.

I/O PROGRAM 2

FIG. 2 is a typical panel, teletype or modem I/O program. After initializing the registers, the operating system will display TEST NO?. The operator then has 20 seconds to enter the desired test number. After 20 seconds have expired without data input, the program returns to point B (FIG. 1) for self-testing and receiving new interrupts.

Upon entering the test number, the system inquires whether the selected test number is the one designated for performing all tests on all channels (ACAT). If yes, the operating system will display START? asking the operator to enter the number of the first of a sequence of channels to be tested. If the operator does not enter a channel number within 20 seconds, the program returns to point B (FIG. 1).

If, however, a beginning channel number was entered, the system will respond with STOP? asking the operator to enter the last channel number of the sequence to be tested (a 20-second input time is again allowed). After the last channel number has been entered, the program will sequentially run alll tests on all selected channels and display the bad or busy channels.

If the panel was chosen as the I/O device, the system will display the first bad channel. Approximately 20 seconds testing time is allowed per channel. A bad or busy channel is displayed until the next bad or busy channel is detected. Thus, an operator has to monitor the panel in order to record bad or busy channels. If the TTY or modem was chosen as the I/O device, the system prints out the bad or busy channels continuously until all channel numbers have been exhausted.

If the selected test number is not the one designated for all channels-all tests, the system will ask the operator to enter the desired channel number. If no number is entered within 20 seconds, the program will branch to point B (FIG. 1). If, however, a channel number is entered, the system inquires whether the test number equals the ringing test. If yes, the system asks the operator to input the subscriber's telephone number.

After receiving the subscriber's number or if the ringing test was not selected, the system will perform a test selection subroutine (TESBRH (4)). After performing one of the "nested" subroutines (11, 12, 13 or 14) corresponding to the selected test (see FIG. 4), the system will format and display the results via a conventional display formating subroutine.

If the panel was chosen as the I/O device, after displaying the first result of a multiple-result test, the system inquires whether that was the last result to be displayed. If not, the system gets the next result and branches back into the formating subroutine. This procedure is repeated until all test results have been displayed. The system then branches to point B of FIG. 1.

If the TTY or modem was chosen as the I/O device, the system prints out the results continuously until all results have been exhausted, whereupon the system branches to point B (FIG. 1).

INTERRUPT 3

FIG. 3 is an interrupt input subroutine. This subroutine first determines with I/O device caused the interrupt. It then decides whether the system is busy. If the system is already in use, the interrupting I/O device will be caused to indicate SYS BSY. If, on the other hand, the system is not busy, the operating system will store the identity of the interrupting device by setting an appropriate status bit or flag. Thereafter, it will return to the point the interrupt subroutine was called.

TESBRH 4

Figure 4:
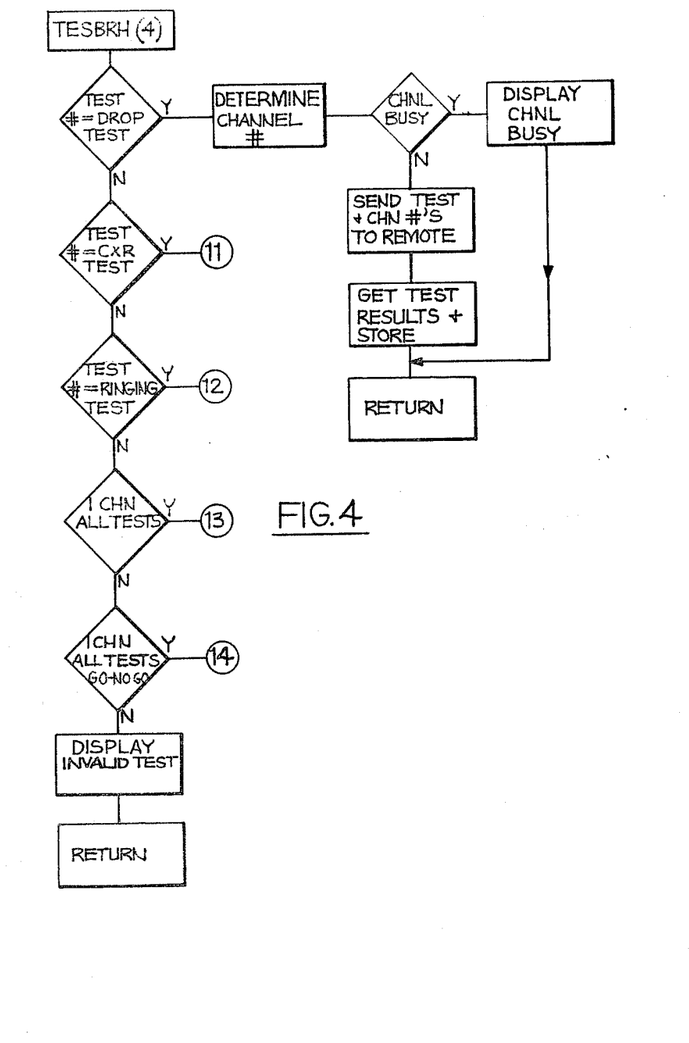
FIG. 4 is a branch subroutine designed to check which test has been requested.

FIG. 4 is a branch subroutine designed to check which test has been requested. The operating system will first decide whether the requested test number is that of the drop test. If yes, it will determine the number of the channel being tested. and instruct the RTS to test that channel to see if it is busy. If yes, it will display CHNL BSY and return. If, however, the channel is not busy, the operating system will send the test and channel numbers to the RTS, get the test results, stored them in appropriate registers and return to the point the subroutine was called.

If the test number is not the one designated for the drop test, the system next decides whether the number is that assigned to the carrier (CXR) test. If yes, it goes to the CXR test routine 11 described hereinafter. If no, the system decides whether the test number is that of the ringing test. If so, the system branches to the ringing test routine 12 and returns after it has performed that test.

If, on the other hand, the ringing test was not requested, the operating system decides whether the test number is the one of performing all tests on one channel-OCAT 13. If yes, the system sequentially performs all tests and returns. If no, the system asks whether the test number is the one for performing all tests on one channel on a go-no go basis (OCAT GO-NO GO (14)). If yes, the system sequentially performs all tests and returns.

As previously indicated, the manner in which the test results are displayed depends on the I/O device chosen. If the panel was chosen, the results of the tests will be displayed one at a time. After each display the operator must press the button on the panel to display succeeding results. If, however, the TTY or modem was chosen as the I/O device, the test results will be sequentially and continuously printed until all results are given.

If, however, this last decision and all previous decisions in this sequence were negative, the test number entered was erroneous, i.e., it is not one of the test numbers assigned to the system. In this event, the operating system will display INV TEST (invalid test) and return to the point subroutine TESBRH was called.

RESISTANCE 5

Figures 5, 6, 7, 8, 9:
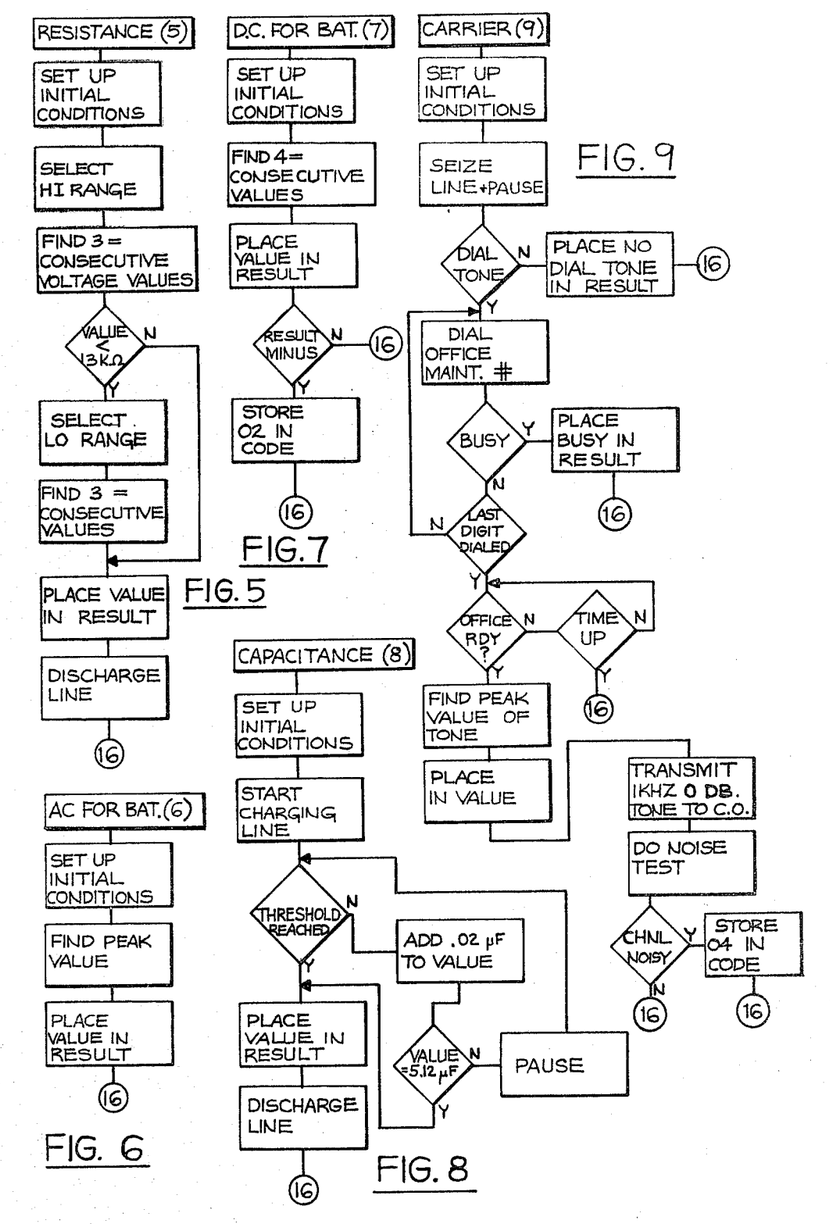
FIG. 5 is a resistance test routine.
FIG. 6 is a routine designed to test for the presence of an alternating current foreign battery.
FIG. 7 is a subroutine designed to test for the presence of a direct current foreign battery.
FIG. 8 is a capacitance test routine.
FIG. 9 is a carrier test routine designed to check the presence of a dial tone on the subscriber line.

The operating system first sets up initial conditions and selects the high range on its measuring instrumentation. It then finds three equal consecutive voltage values in order to avoid transients in the line. Transients will occur in the first instances when the line is energized and give erroneous readings. A constant voltage is needed in order to get accurate resistance readings.

If the value of the reading is less than $13k\Omega$, the system knows that it used the wrong range on its measuring instrumentation. It thus selects the low range and again finds three equal consecutive values.

Figures 15, 16:
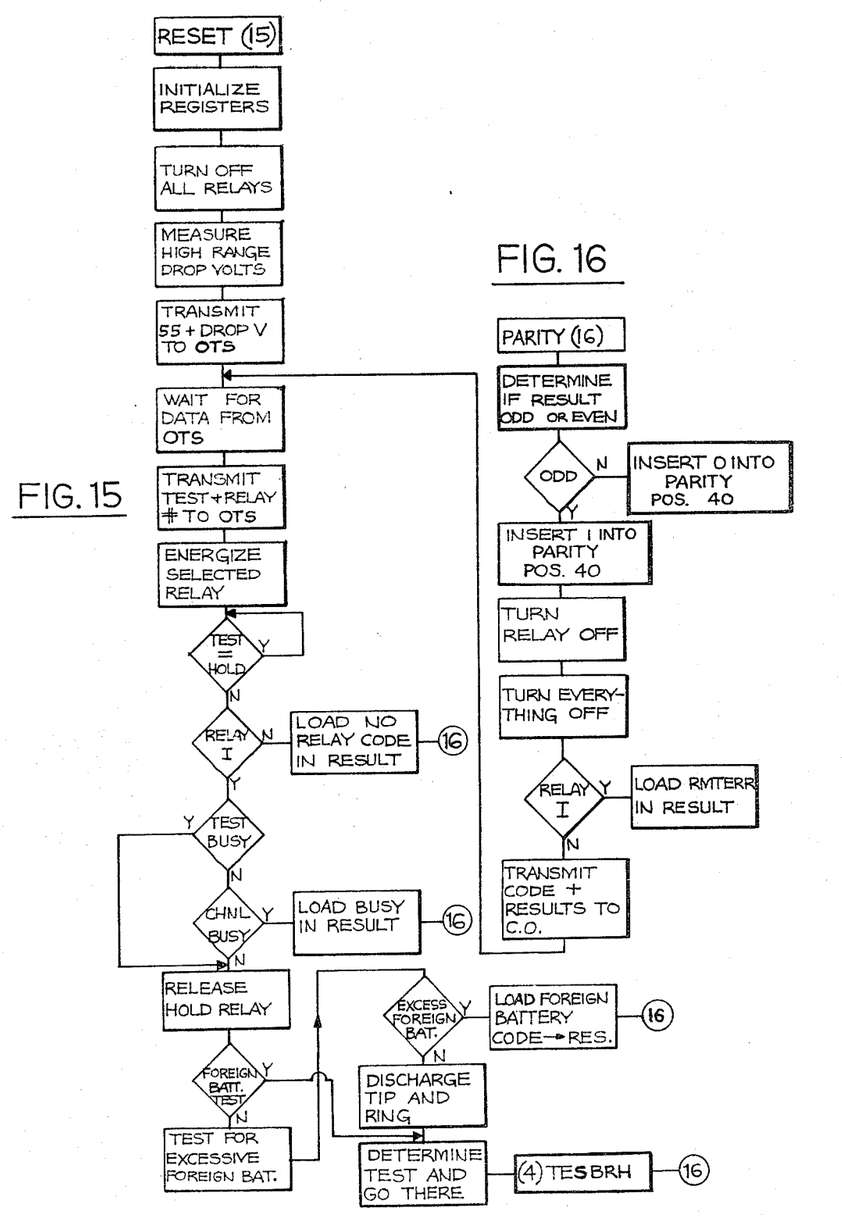
FIG. 15 is a routine designed to initialize all relays and registers, calibrate the testing instruments and prepare the lines for testing.
FIG. 16 is a parity test routine.

If the first resistance reading above was more than $13k\Omega$, the system placed that value in the result. Thereafter, the system discharges the line and goes to the parity test 16 discussed hereinafter.

AC FOREIGN BATTERY 6

After setting up initial conditions, the operating system tests for AC voltage on the line. It seeks to find the peak value of the voltage. It then places this value in the result and goes to the parity test 16. If all is well, the AC voltage value on the line should be essentially zero.

DC FOREIGN BATTERY 7

Again, after setting up the initial conditions, the testing system seeks to find three equal consecutive voltage values in order to avoid transients in the line. It then tests this value to find whether it is positive or negative. If positive, the system will immediately go to the parity test 16. If, however, the voltage value is negative, the system will store "2" in the result code so as to produce a negative display, and then conduct the parity test 16.

CAPACITANCE 8

From the remote end (RTS), the system selects a subscriber line in accordance with the test instructions and initializes that line by discharging it completely. The system then applies a known reference voltage (e.g. 100 volts) to the selected line. It then measures the line voltage to see if it has reached a predetermined threshold voltage (e.g. 63 volts). On the first iteration, the threshold would immediately be reached only if there is no capacitance at all in the circuit, as would be the case on an open line at the test set. If this were to occur, the initial value of zero would be placed into the result. However, since this is not normally the case in the real world, the first iteration of the program branches off to add 0.02 µf to the capacitance value which is to be placed in the result at the end of the test. The program now tests to see whether the thus incremented value is 5.12 µf; and if it is not the program pauses for a predetermined length of time. The length of the pause is equal to the length of time it would take a line having a 0.02 µf capacitance to come up to the threshold value of 63 volts.

After the pause, the program returns to the threshold decision. If the threshold has been reached, the value of 0.02 µf is placed in the result; if not, the value to be placed in the result is incremented by another 0.02 µf, and the program once again pauses long enough for a line with a 0.02 µf capacitance to reach the threshold.

The same iteration is continued until either the threshold is reached and the corresponding incremented capacitance value is placed in the result, or until the capacitance value has reached 5.12 µf, which is the upper limit of the measuring range which the system can accommodate. If a value of 5.12 µf has been reached, the system places that value in the result regardless of the real capacitance of the line.

When a capacitance value has been placed into the result, the line is discharged and the program branches to the parity test 16 and the transmission of the result to the office test set (OTS).

CARRIER 9

FIG. 9 is a carrier test routine designed to check the presence of a dial tone and noise on the subscriber line. When this routine is called, the operating system seizes the line, pauses and inquires whether a dial tone is present. If none is present, the system merely places this in the result and goes directly to the parity test 16.

If, however, a dial tone is present, the RTS dials, one digit at a time, the 7-digit office maintenance number preset on a bank of seven rotary switches on the RTS panel. If that line is busy, the operating system places this in the result and proceeds to the parity test 16. If the maintenance line is not busy, the system continues to dial until the last digit has been dialed.

If, the last digit of the 7-digit office maintenace number has been entered without getting a busy signal, the RTS will check the presence and level of a 1 kHz, Odb tone generated for the purpose of this test by the OTS. It does this for a prescribed incremental amount of time. If the RTS finds no office tone after the prescribed time, it merely goes to the parity test 16 subroutine. The display will then remain at zero.

If, on the other hand, the RTS finds an office tone present, it will seek to find the peak value of the tone. It then places this value in the result and transmits a 1 kHz, Odb tone to the central office. Thereafter, the system will do a noise test on the channel, and if it finds that the channel is not noisy, it will conduct the parity check 16. If, however, the channel is noisy, the operating system will store 04 in the code to produce a NOISY output in the display, and then go to the parity test 16.

RING VOLTAGE 10

FIG. 10 is a ring voltage test across the three wires (Tip, Ring, Ground) to the subscriber line. The ring voltage test is conducted on a go-no go basis. After setting up initial conditions, the RTS releases the hold relay which opens the subscriber line. Then, for a prescribed period of time, the operating system can conduct ring voltage tests.

If the prescribed time is not yet up, the system may perform the TIP-GND test. If performed, the RTS takes a reading and places the TIP-GND ring voltage in the result. Thereafter, it will proceed to the parity check 16.

If the TIP-GND ring voltage test was not performed, the system automatically sequences to the TIP-RING test. If this test is performed, the RTS takes the reading and places the result in the appropriate register.

If the TIP-RING test was not performed, the system proceeds to the final voltage test of the routine, the RING-GND test. If this last test is performed, the system places this result in the appropriate register and continues with the parity test 16.

If, however, the last decision was negative and all previous decisions were negative, the operating system will again check whether the prescribed time is up. If not, the system will again go through the entire sequence above. If the time sufficient to get 1 or 2 ring signals has expired, the operating system will place no ring voltage in the result and proceed to point 16.

CXR TEST 11

FIG. 11 is a carrier test designed to measure the decibel drop of a 1 kHz tone over the line. The OTS first finds the appropriate channel to be tested. It then sends a command to the RTS for the RTS to dial up the OTS over the maintenance line 23 (FIG. A). If the RTS fails to receive a dial tone upon seizing the maintenance line 23, it transmits NO DIAL TONE to the OTS, and the test is aborted. If the RTS does get a dial tone but finds the selected channel to be busy, the system stores CHNL BSY in the result and returns to the point where the CXR subroutine was called.

If, however, the selected channel is not busy, the OTS tests if it has ringing voltage over the line for a specific increment of time (e.g. 20 seconds). If no ringing voltage is present and the time for testing the presence of such voltage is up, the operating system will display NO RING and return.

If, on the other hand, ringing voltage is present, the OTS first measures and records the noise level on the line, and then notifies the RTS that ringing voltage has been received. The OTS next turns on a 1 kHz oscillator for two seconds. The RTS measures the level of that tone and records the result. The RTS then transmits a 1 kHz tone for two seconds, the level of which is measured and recorded by the OTS. Following the transmission of the tone, the RTS measures the noise on the line and transmits its readings to the OTS over the command channel 30.

RINGING 12

FIG. 12 is a ringing test. The OTS seizes the maintenance line and determines whether a dial tone is present. If none is present, the system stores NO DIAL TONE in the result and returns. If a dial tone is present, the OTS dials the selected subscriber's telephone number. If then transmits a command to the RTS to look for ringing voltage on the selected subscribed line, gets the results, stores these results and returns.

OCAT 13

FIG. 13 is a routine designed to perform all tests on a single channel. The system enters this routine by initializing the test number to one (1). It then determines the appropriate channel number and tests for a busy signal. The OTS then transmits a command to the RTS to perform the first test. The system then transfers the results back to the OTS and stores them for display.

Thereafter, the operating system increments the test number and compares it with the last test number. If the test number is greater than the last test number, then all tests have been completed and the system returns. If, however, the test number is less than or equal to the last test to be performed, the system branches back to perform the next test.

OCAT GO-NO GO 14

FIG. 14 is a subroutine designed to perform all tests on a single channel in the go-no go mode. When this subroutine is requested, the system first performs the "nested" subroutine OCAT (FIG. 13). It then tests all results for pass/fail on the basis of predetermined criteria. If the channel has failed one of the above tests (any drop or carrier tests), it is considered bad and the system returns to the point where this subroutine was called. If, on the other hand, the channel has passed all the above tests, it is considered OK and the system displays this result before returning to the main program.

RESET 15

FIG. 15 is a routine designed to initialize all relays and registers, calibrate the testing instruments and prepare the lines for testing. The RTS first turns off all relays and measures the high range drop volts for calibration purposes. It then transmits "55" (check bits to insure transmission is unobstructed) and the drop volts to the OTS. Thereafter, the RTS waits for data from the OTS. The OTS will give the RTS the bank number, relay number and test number. If no request was made, the C.O. will transmit all ones (1s) for 200 milliseconds.

In the event a request was made, the RTS will acknowledge receiving the OTS data by transmitting the test and relay numbers back to the OTS. The OTS will reset the RTS if the acknowledgement is in error. If all is well, the RTS will energize the selected relay and test whether the corresponding hold relay 28 is open. If not, the operating system will inquire whether there is relay current I. If this latter decision is no, the system loads no relay code in the result and goes to PARITY 16.

If, on the other hand, relay current I is present, the system will ask if the requested test is currently being performed. If no, it tests whether the requested channel is busy. If the latter decision is yes, the system loads busy in the result and goes to the parity test at point 16.

If the channel is not busy or the requested test above was already being performed, the RTS will release the hold relay and inquire whether the test number is that of a foreign battery test. If the test number is that designated for a foreign battery test, the RTS will determine which test (AC FOREIGN BATTERY [6] or DC FOREIGN BATTERY [7] is to be performed and then branches to the TESBRH 4 subroutine.

If, however, no foreign battery test is requested, the system will nevertheless test for the presence of an excessive foreign battery. If this decision is positive, the operating system will load "foreign battery" code into the result and go to the parity test 16. If the latter decision is negative, the system discharges tip and ring wires, determines which test (3–10) has been requested, performs the selected test, performs subroutine TESBRH 4, performs "nested" subroutines 11–14 if requested and re-enters for the parity check 16.

PARITY 16

After practically every test, the system re-enters the main program via the parity check subroutine which determines whether the result of the test is odd or even. If even, the operating system inserts zero (0) into parity position 40. If odd, the system inserts one (1) into parity position 40. It then turns both the test relay 23 and hold relay 28 off. In addition, it turns the RTS off. The system then tests whether relay current I is still present, in which case it displays RMT FAIL.

If no relay current is present, the system transmits the code and results to the central office. Thereafter, the RTS will again come on and wait for data from the OTS.

What is claimed is:

1. A system for testing telephone subscriber lines from a central office, the central office coupled to a central multiplexing means, the central multiplexing means coupled through trunks to a remote multiplexing means and the remote multiplexing means coupled through subscriber lines to subscriber equipment, comprising:
    (a) a central office test set connected to said central office by a designated line;
    (b) a remote test set coupled to said remote multiplexing means, said central multiplexing means and said central office test set through a dedicated trunk line;
    (c) means at said remote test set for communication with each of the subscriber lines;
    (d) means at said central office test set for establishing a test command through said dedicated trunk line to said remotely located test set and addressed for specific one of said subscriber lines;
    (e) means at said remote test set for transmitting test results to said central office; and
    (f) means for displaying said test results at said central office.

2. The system of claim 1 wherein the display means is a display panel.

3. The system of claim 1 wherein the display means is a teletype printer.

4. The system of claim 1 wherein the display means is a modem.

5. The system of claim 1 wherein said office test set conducts continuous hardware tests of said central office and said remote test set, subscriber lines and subscriber equipments unless interrupted.

6. The system of claim 1 wherein a drop test is performed from said office test set; through said dedicated line.

7. The system of claim 6 wherein the drop test is a resistance test.

8. The system of claim 6 wherein the drop test is a capacitance test.

9. The system of claim 6 wherein the drop test is a direct current foreign battery test.

10. The system of claim 6 wherein the drop test is an alternating current foreign battery test.

11. The system of claim 1 wherein a carrier test is selectively performed from either said office test set or said remote test set.

12. The system of claim 11 wherein the carrier test is a db level test.

13. The system of claim 11 wherein the carrier test is a dial tone test.

14. The system of claim 11 wherein the carrier test is a ringing test.

15. The system of claim 1 wherein all tests on a single channel are performed.

16. The system of claim 15 wherein all tests are performed on a go-no go basis.

17. The system of claim 1 wherein all tests on all channels are performed on a go-no go basis.

18. The system of claim 1 wherein the office test set has capability to remotely dial particular ones of said subscriber lines.

19. The system of claim 1 wherein said remote test set can directly dial the office test set, whereby the entire trunk loop can be tested directly in one measurement at the central office.

* * * * *

UNITED STATES PATENT AND TRADEMARK OFFICE
CERTIFICATE OF CORRECTION

PATENT NO. : 4,424,421
DATED : January 3, 1984
INVENTOR(S) : Townsend and Streenan It is certified that error appears in the above—identified patent and that said Letters Patent is hereby corrected as shown below:

| | | | | |
|---|---|---|---|---|
| Column 4, | line | 20 | - | "There" should read --These--. |
| " 4, | " | 22 | - | "propely" should read --properly--. |
| " 4, | " | 34 | - | "RDY?," should read --RDY!,--. |
| " 4, | " | 67 | - | "alll" should read --all--. |
| " 5, | " | 58 | - | "stored" should read --store--. |
| " 8, | " | 63 | - | "subscribed" should read --subscriber--. |

Signed and Sealed this

First Day of May 1984

[SEAL]

Attest:

GERALD J. MOSSINGHOFF

Attesting Officer    Commissioner of Patents and Trademarks